Dec. 27, 1966 N. D. HAUGEN 3,294,473
VISUAL ACUITY PROJECTOR WITH ELECTRIC MOTOR CONTROL FOR FILM
CHART AND ROTARY ASTIGMATIC TEST ELEMENT
Filed Jan. 9, 1963 2 Sheets-Sheet 1
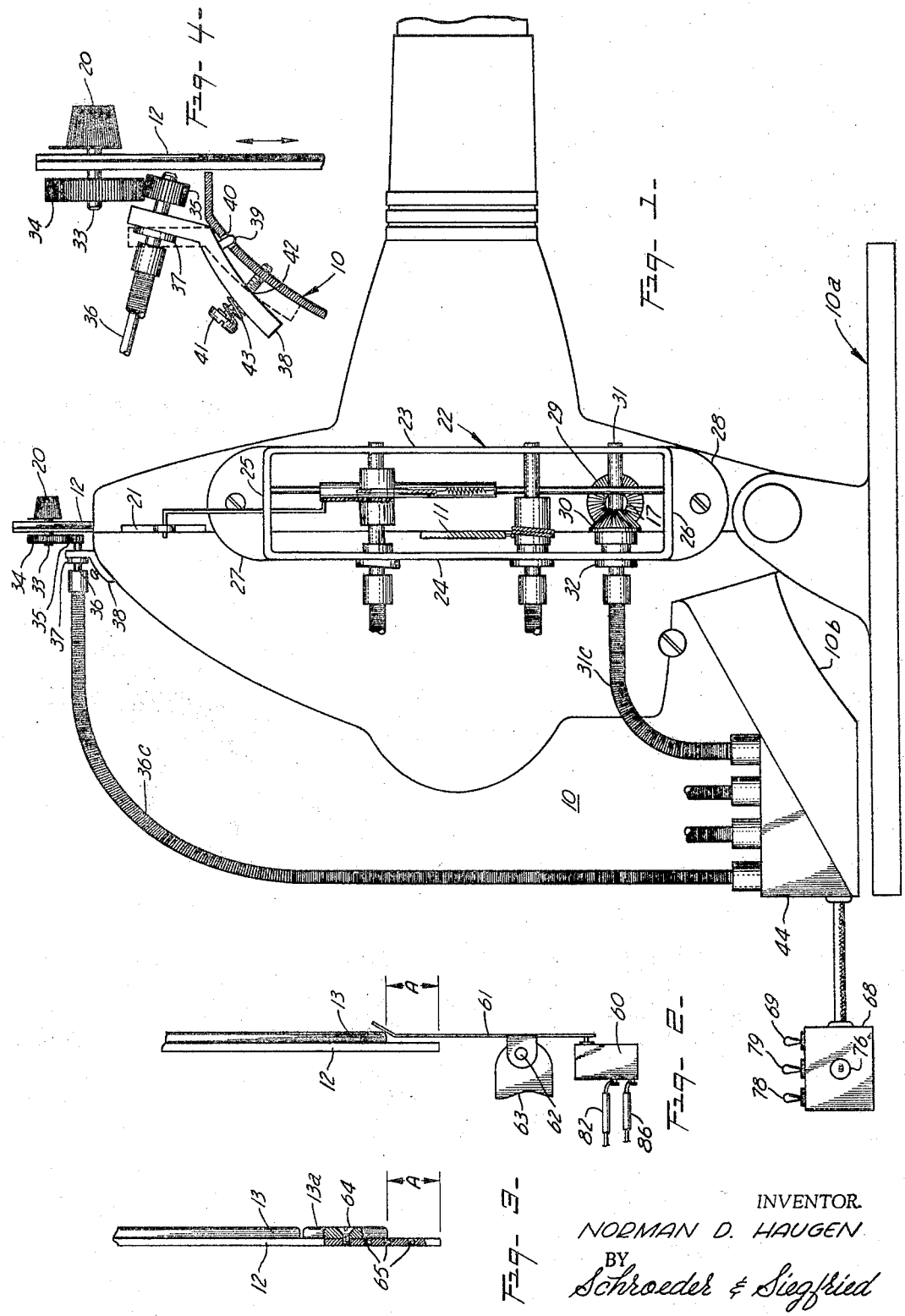
INVENTOR.
NORMAN D. HAUGEN
BY
Schroeder & Siegfried
ATTORNEYS

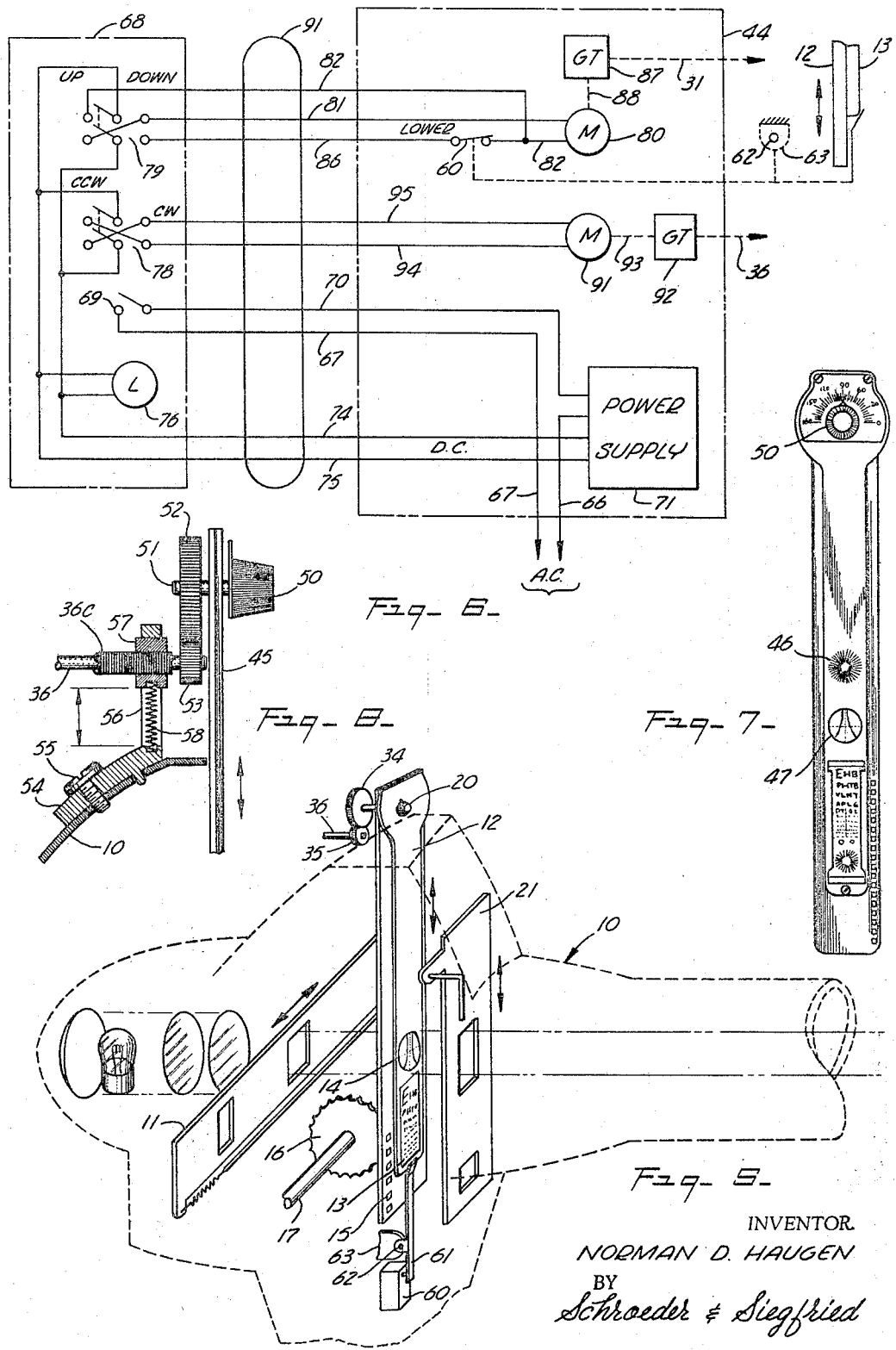

United States Patent Office 3,294,473
Patented Dec. 27, 1966

3,294,473
VISUAL ACUITY PROJECTOR WITH ELECTRIC MOTOR CONTROL FOR FILM CHART AND ROTARY ASTIGMATIC TEST ELEMENT
Norman D. Haugen, Minneapolis, Minn., assignor to The Benson Optical Company, Minneapolis, Minn., a corporation of Minnesota
Filed Jan. 9, 1963, Ser. No. 250,438
4 Claims. (Cl. 351—30)

This invention relates to the field of visual acuity projectors, but more particularly to remote control of the film chart used with the projector.

This invention is an improvement upon a portion of another of my copending applications entitled "Visual Acuity Projection Apparatus," filed October 29, 1962, under Serial Number 233,579.

It has been well recognized that in the field of eyeglass fitting and testing of visual acuity of the eye, that projectors incorporating certain film charts or slides having various selected characters, lines, colors, etc. are being used and possess definite advantages over the old fashion wall charts. As pointed out in my copending application, the use of the projectors in this field has been a decided improvement but the projectors thus far exhibit certain undesirable characteristics and disadvantages. The main objection is that the projector generally had to be within reach of the operator and that the instruments being used for correctly fitting the eyeglass lenses must also be within easy reach of the operator and therefore the work area is generally somewhat cluttered and cumbersome.

The improvements in projection apparatus as disclosed in my copending application overcomes most of the undesirable characteristics of the projector by being able to remotely control the projector and therefore remove it from the so-called "cluttered" area. By placing the projector in a permanent location which is out of the way of the patient and operator who is fitting the eyeglasses it does produce one additional problem where the operator must make several changes to the film chart, and in the tests where rotatable test figures are used and must be rotated such as the paraboline test figure. Generally speaking, this is done by rotating a knob at the top of the slide to a desired angle by hand, the rotary motion generally being restricted to 180°. Of course, if this must be done very often, it then requires that the operator leave the location where the glasses are being fitted to properly rotate the paraboline test figure. Furthermore, it has been found that the film charts or slides are of varying lengths and therefore it becomes highly desirable to provide a control means for controlling the vertical movement of the film charts independently of the length of the film charts. Also, since the rotatable test figures are generally brought into view when the film chart is at or near its lower most position (depending on whether there are one or two figures on the slide), means must be devised so that the test figure or figures may be rotated after the slide has reached its proper position yet not be connected permanently to any means of rotary driving mechanism in order that the film charts may be readily changed.

The present invention contemplates using the projector with electro-mechanical controls so that the film chart may be driven to its proper position regardless of its length and stopped at its lower most position of travel. In its upper most position of travel the apparatus is constructed and arranged so that the driving means continues to drive but the film chart is unaffected and it not moved further upwardly. The invention further contemplates driving the paraboline or other test figures within the film chart when the film chart is at or near its lower most position and yet allow convenient replacement of the film charts without having to disconnect the driving mechanism as well as providing means for readily engaging the driving means when the film chart is driven to its proper position.

It is therefore a general object of the present invention to provide a new and novel improvement in remote controls for visual acuity projectors.

It is yet a more specific object of this invention to provide means for remotely controlling the movement of the film chart and its rotating pointer or test figure.

It is yet another object of the present invention to provide new and novel electrical means for controlling the downward and upward travel of the film chart.

It is still a further object of this invention to provide means whereby the downward travel of the film chart may be controlled for film charts having different lengths.

It is still another object of the present invention to provide resiliently urged means for connecting power to the rotating pointer or test figure of a film chart.

It is still a further object of this invention to provide remote means for controlling the movement of the film chart and its pointer independently of each other.

It is yet another object of this invention to provide remote control means which may be movingly located without causing movement of the film chart or its rotating pointer during such movement.

These and other objects and advantages of this invention will more fully appear from the following description, made in connection with the accompanying drawings, wherein like reference characters refer to the same or similar parts throughout the several views, and in which:

FIG. 1 is a side view of the projector showing the driving apparatus attached thereto;

FIG. 2 is a partial view of the lower end of the film chart and its limit switch arrangement;

FIG. 3 is a partial view of the lower end of the film chart showing the adjustable switch stop arrangement;

FIG. 4 is a partial section of the driving arrangement for the pointer of the film chart showing the gears in unmeshed position;

FIG. 5 is a diagrammatic view of the film chart and its driving mechanisms;

FIG. 6 is a electrical schematic diagram of the remote control means;

FIG. 7 shows a particular type of film chart in which two rotatable images are used; and FIG. 8 shows a partial section of the gearing arrangement used with a film chart using double rotatable image.

FIG. 5 shows the diagrammatic outline of a projector 10 which has a barrel containing several lenses to properly focus the images being projected upon a screen (not shown). Situated within the body of the projector between the forward lenses just described and the reflector, bulb, and condensing lenses, is a horizontally movable mask 11 and directly in front of mask 11 is a film chart 12. Film chart 12 contains numerous images such as those found in lower portion 13 and in the rotatable image 14 which is generally directly above the lower portion. This part of the film chart is generally of greater thickness than the body portion of the chart which contains a number of sprocket holes 15 and normally engage a sprocket gear 16 driven through a shaft 17. Image 14 is quite often referred to as a paraboline test figure or it may be a single rotating dial or pointer which is generally rotated by a control knob 20 located at the top of the film chart 12. Located in front of film chart 12 is a vertically movable mask 21. This diagram shows the relative placement of the film chart with respect to the other parts in the projector and a further detailed description will be given of its operation.

Referring to FIG. 1, it will be found that fastened to the outside of housing 10, is a bracket 22 which has a pair of side plates 23 and 24 which are vertically mounted in opposed and spaced relation to each other where their upper ends are connected to each other through a plate 25 and their lower ends are connected to each other through a plate 26. Extending outwardly and upwardly from upper plate 25 is a right angle portion 27 which is fastened to housing 10 by a suitable means such as screws. In a like manner, a right angle portion 28 of plate 26 extends outwardly and downwardly which is suitably fastened to housing 10. Fastened to the end of shaft 17 is a bevel gear 29 which engages another bevel gear 30. Bevel gear 30 is secured to a shaft 31 by suitable means such as set screws where shaft 31 extends through a bearing portion of plate 22 and which has a flexible portion 31c which has an outer housing that is connected to plate 24 by extending through a hole therein and being held in place by a lock nut or other suitable fastening means 32. Situated above gears 29 and 30 are the other driving means for driving the horizontally movable mask 11 and vertically movable mask 21. However, these means do not form a part of this invention and they will therefore not be set out in any detail.

Knob 20 which is connected to the rotatable elements 14 of film chart 12 has a shaft 33 in communication therewith upon which is fixedly fastened a spur gear 34. A smaller spur gear 35 is in operable engagement with gear 34 and is connected to the end of a shaft 36 which is contained within a cable 36c. Shaft 36 is supported within a bearing 37 which is held in place by a bracket 38. For a more detailed reference to that portion of the apparatus, reference is invited to FIG. 4 in which bracket 38 includes a lug 39 that is fitted into a horizontal slot 40 that is formed in the outer housing of projector 10. As will be seen later, lug 39 and slot 40 cooperate to provide a pivoting point for bracket 38 and a screw 41 is threadedly fitted into housing 10 through a hole 42 formed in bracket 38. Situated between the head of screw 41 and bracket 38 is a spring 43 that continually urges bracket 38 towards housing 10 or into a normal position. It will therefore be seen that when spur gear 34 is driven into engagement with gear 35, should the two gears not mesh, then bracket 38 is pivoted clockwise about lug 40 until rotation of shaft 36 causes gear 35 to be properly aligned with gear 34 and the two mesh where spring 43 causes bracket 38 to be driven towards housing 10 in its normal position.

Projector 10 has a base 10a upon which the projector is mounted and the housing 10 carries a bracket 10b upon which is mounted an electrical driving means 44. Electrical driving means 44 may be mounted to bracket 10b by any suitable means such as screws. The structure within driving means 44 will be described more fully in reference to FIG. 6. Flexible cables 31c and 36c extend downwardly and are connected through the outer housing of driving means 44.

It should also be pointed out that some of the film charts have a pair of rotatable images. A film chart 45 of this type is shown in FIG. 7 having a pair of rotatable images 46 and 47, both of which are controlled by a control knob 50 located at the upper portion of the film chart in the same manner as film chart 12. For this type of operation it will be seen that image 46 must be moved downwardly at least the diameter of image 47 in order that the gearing means may drive the images automatically. In other words, the gearing must "float" in some manner so that power may be applied to cause both images 46 and 47 to rotate even though there is a difference of approximately one inch between their centers which must be moved into the path of the light beam in the projector.

In FIG. 8, film chart 45 is shown in a position where image 47 would be projected by a projector 10. In this case, a shaft 51 connects knob 50 to a spur gear 52, and another spur gear 53 is connected to shaft 36. A bracket 54 is fastened to housing 10 by suitable means such as a screw 55. Bracket 54 has an upward extending portion in which a vertically extending slot 56 has been formed and cable housing 36c is supported in a follower 57 so that follower 57 rides upwardly and downwardly within vertical slot 56. In order that gears 52 and 53 are constantly urged towards each other in operative engagement, a spring 58 which is normally under compression, constantly pushes between follower 57 and the lower part of bracket 54 where a bore is contained to support the lower part of spring 58. Therefore, it will be seen that while the gears are engaged while image 47 is being projected upon a screen, should film chart 45 be driven downwardly so that image 46 may be projected, gear 53 moves downwardly with follower 57 and maintains its engagement with gear 52 to cause rotation of both images 46 and 47.

Reference is now made to FIGS. 2, 3, and 5 where it can be seen that film chart 12 is driven by sprocket gear 16 by engagement with the slots 15 on the side of film chart 12. Upon film chart 12 reaching its upper most position, it will be seen that sprocket 16 will merely cause chart 12 to oscillate over the teeth of sprocket 16 as it reaches the end of its travel since it will continue to be held within the projector and having reached the end of its travel merely rides over the top of each of the teeth on sprocket 16. However, in its downward movement, it is quite important that the slide be stopped at the proper position so that image 14 may be projected and that gears 34 and 35 are operably engaged. In order that film chart 12 is stopped at precisely the correct position in its downward travel, a miniature snap action switch 60 is disposed in such a position that it may be actuated by a switch arm 61 which is pivoted about a pivot 62 which engages a projecting lug 63 which is part of the projector housing. The upper end of switch arm 61 engages the lower end of the images 13 of the film chart and as this portion moves downwardly, switch arm 61 is rotated about pivot 62 to actuate switch 60. As will be more fully explained later, switch 60 forms a lower limit switch in the circuit which controls the film chart driving means.

Since the film chart varies in length where different images are to be projected, it is desirable to have a movable or adjustable limit stop 13a which may be secured to film chart 12 by suitable means such as screws 64 which can be inserted in any one of a number of screw holes 65 spaced longitudinally in the lower portion of film chart 12. Using this method of adjustment, the film chart will be stopped at its proper position. To demonstrate more fully, the same distance between the end of lower portion 13 and the extreme end of film chart 12 is designated as the distance "A" and this same distance is maintained in the structure found in FIG. 3 using the limit stop 13a. Under this arrangement, the driving means for film chart 12 would always be deenergized at the same position of downward travel.

Electrical driving means 44 contains a power unit which receives alternating line current through a pair of conductors 66 and 67. Conductor 67 extends to a control unit 68 where it is connected to one terminal of a single-pole-single-throw switch 69. The other terminal of switch 69 is connected to a conductor 70 which provides an alternating current to the input of a direct current power supply 71. Conductor 66 is also connected to the input of power supply 71. Power supply 71 may be any suitable power supply such as a copper oxide rectifier or one employing electron tubes for converting alternating current to direct current. Direct current is taken from the output of power supply 71 and applied to a pair of conductors 74 and 75. Conductor 74 is connected to one terminal of a lamp 76 indicating that power is applied thereto and is also connected to one of the central terminals of two double-pole-double-throw switches 78 and 79. Conductor 75 is connected to the other terminal of lamp 76 and the other central terminals of double-pole-double-throw switches 78 and 79. It should be kept in mind that lamp 76 indicating that the direct current is applied to the system, and switches 69, 78, and 79 are all located in the control box 68. A motor 80 which is preferably of the D.C. reversible type, has a common connection through a conductor 81 with opposite terminals on both sides of switch 79 so that the polarity of the voltage may be reversed to the motor to provide a reversible operation for the motor. A parallel circuit is formed as a return conductor for motor 80 where a conductor 82 connected to motor 80 is connected to one of the terminals of a single-pole-single-throw switch 60 and to one of the outside terminals of reversing switch 79. The other terminal of switch 60 is connected to a terminal on the opposite side of switch 79 through a conductor 86. Motor 80 is connected to a gear train 87 shown in block diagram form through a shaft 88 where a suitable gear ratio is selected. Gear train 87 has its output through shaft 31 which, of course, is connected to shaft 17 through gears 29 and 30.

Switch arm 61 is shown diagrammatically and in engagement with the lower portion 13 of film chart 12 and the switch arm of switch 60. Since film chart 12 is driven through shaft 31, upon it reaching its lower most position, switch 60 is opened and the current no longer energizes motor 80.

Another motor 91 is connected to a gear train 92 through a connecting shaft 93, the output of the gear train being provided through shaft 36. Motor 91 may be of the same type as just described and has a pair of conductors 94 and 95 which are connected to each of the terminals on one side of switch 78 and to the opposite terminals on the other side of switch 78 in common reversing switch fashion.

All of the conductors extending between control box 68 and the driving means 44 may be encased in a single cable 91, it being understood that cable 91 may be of any convenient length.

*Operation*

Where the film chart such as film chart 12 is used, by movement of switch 79 in a proper position, film chart 12 may be moved from its upward position to its lower position or stop at any particular line of the images on the film chart to project the proper information. Upon the film chart reaching its lower limit of travel where gear 34 engages 33, if the gears to not mesh, bracket 38 is pivoted about lug 39 until by further rotation of gear 35 the gears mesh and bracket 38 returns to its normal position. Thus, the control of the images may be accomplished and upon the images reaching a predetermined limit, should the motor continue to drive, then gear 35 becomes unmeshed with gear 34 and the teeth merely climb over each other where bracket 38 is again pivoted clockwise as seen in FIG. 4 and remains so until the motor stops driving. For this particular purpose it has been found that the gears making up this gearing arrangement are preferably made of nylon or some other suitable material where a small amount of wear is encountered and little damage is done to the gearing during this particular operation. Film chart 12 may then be driven upwardly and continue in an upwardly direction since there is no obstruction or reason to limit the travel of the film chart 12 in an upwardly direction, and therefore, when it reaches its upper limit sprocket 16 merely continues to urge film chart 12 in an upwardly direction and slip over the end thereof.

Since the film charts may have various lengths, it is necessary that switch 60 be actuated in the same position each time and therefore the switch limit block 13a may be adjusted for those particular film charts requiring the limit stop, so that the film chart is prevented from being driven beyond the point of the engagement of gears 34 and 35.

Where the film chart contains two images which must be rotated such as found in FIG. 7, film chart 45 is inserted in the projector and is driven downwardly until gears 52 and 53 mesh thus producing an image such as 47. Where it is desirable to project the other image such as 46, switch 79 is actuated and film chart 45 is driven downwardly where image 46 is projected. At this point, switch 60 is actuated to stop the downward movement of film chart 45. Once the images are driven to the point of their predetermined limits, if power continues to be applied to cable 36 the follower 57 is pushed downwardly against spring 58 and continues to climb over the teeth of gear 52 until the motor stops.

Thus, it can be seen that there has been shown and described improved remote control means for acuity projector apparatus. Specifically it has been demonstrated that different types of film charts may be used with the projector for remote control without materially changing the film chart apparatus and that different types and lengths of film charts may be used with the projection apparatus. It has specifically been demonstrated that the film chart and movable elements thereon may be remotely controlled independently of each other and without causing movement of the chart or rotating elements when the remote control unit is moved from one location to another. By the use of such structure, there is provided a convenient means for replacement of the film charts without having to disconnect the rotating test figure device assembly.

It will, of course, be understood that various changes may be made in the form, details, arrangement and proportions of the parts without departing from the scope of this invention which consists of the matter shown and described herein and set forth in the appended claims.

What is claimed is:

1. In visual acuity projection apparatus, the improvement comprising:
 (a) a projector adapted to receive a film chart normally movable in a vertical plane across the light beam from the projector between predetermined limits of travel;
 (b) a film chart for use with said projector having a rotating astigmatic element rotating between predetermined limits contained therein operably connected to a control element disposed at the upper extremity of said film chart and having a switch engaging portion at the lower extremity thereof;
 (c) electrical driving means including at least one reversible motor carried by said projector and adapted to be controlled electrically;
 (d) power connecting means constructed and arranged to connect said control element of said film chart to said electrical driving means;
 (e) bracket means connected to said projector for supporting said power connecting means, one of said means moving between a first position where said film chart control element is normally engaged by said power connecting means and a second position where said power connecting means is operatively disengaged;
 (f) resilient means continually uring one of said means towards said first position but allowing said means to move to its second position;
 (g) power translating means drivably connected between said film chart and said electrical driving means for vertically moving said film chart;
 (h) switch means connected to said electrical driving means and disposed in operable relation with the switch engaging portion of said film chart for disabling that power which is applied to said power translating means to stop the downward movement of said film chart when said rotating astigmatic element is in the projection light path;

(i) and control means electrically connected to said electrical driving means for controlling the vertical movement of said film chart and the movement of said rotating astigmatic element contained therein.

2. The invention as set forth in claim 1 wherein said switch engaging portion is adjustably disposed on said film chart to engage said switch means upon said power connecting means operably engaging said control element of said film chart.

3. The invention as set forth in claim 1 wherein said control element of said film chart and said power connecting means each include gear means, said bracket means pivoting to said second position upon said gear means being engaged while not meshed.

4. The invention as set forth in claim 1 wherein said control means includes remote means for causing said electrical driving means to move said film chart and said rotating element contained therein independently of each other.

References Cited by the Examiner

UNITED STATES PATENTS

| | | | |
|---|---|---|---|
| 1,579,880 | 4/1926 | Meissner et al. | 88—26 |
| 1,879,501 | 9/1932 | Rigler | 40—53 |
| 2,065,430 | 12/1936 | Cohen | 351—17 |
| 2,299,973 | 10/1942 | Getten | 88—28 |
| 2,366,554 | 1/1945 | Peck et al. | 351—30 X |
| 3,141,374 | 7/1964 | Berry | 88—26 X |
| 3,146,663 | 9/1964 | Kirkconnell et al. | 88—26 X |

DAVID H. RUBIN, *Primary Examiner.*